Jan. 7, 1964     J. WENGER     3,117,006
METHOD OF INCREASING PALATABILITY AND DIGESTIBILITY
OF A CEREAL PRODUCT

Filed Sept. 1, 1960     2 Sheets-Sheet 1

INVENTOR.
Joseph Wenger

BY

*Avery, Schmidt, Johnson & Hovey*
ATTORNEYS.

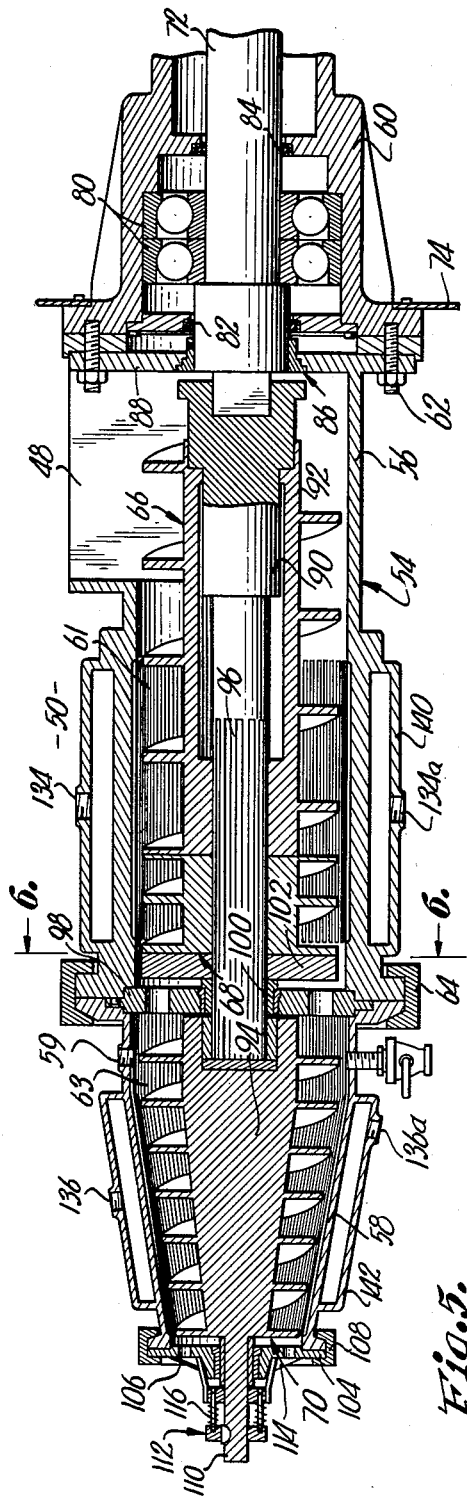
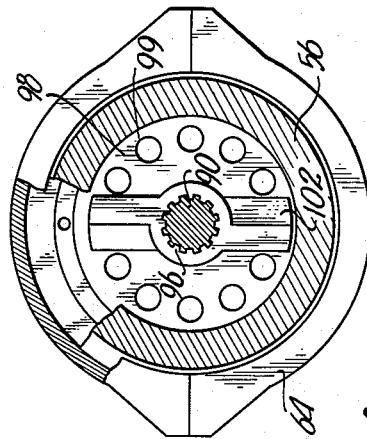
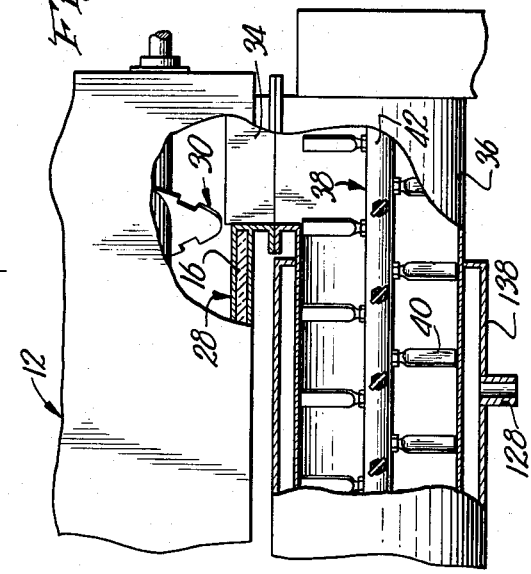
INVENTOR.
Joseph Wenger

United States Patent Office 3,117,006
Patented Jan. 7, 1964

3,117,006
METHOD OF INCREASING PALATABILITY AND DIGESTIBILITY OF A CEREAL PRODUCT
Joseph Wenger, Sabetha, Kans., assignor to Wenger Manufacturing, Inc., Sabetha, Kans., a corporation of Kansas
Filed Sept. 1, 1960, Ser. No. 53,562
7 Claims. (Cl. 99—80)

This invention relates to the treatment of certain substances wherein one of the objects is to increase the bulk thereof by expansion.

Another object, coupled with such expansion or separate therefrom, is to gelatinize the substance.

It is the most important object of the instant invention to provide a method of treatment of substances such as cereals having a high starch content wherein the method is such as to produce a high percentage of starch gelatinization in the end product.

Another important object of the present invention is the provision of a method of starch gelatinization which additionally results in maximum expansion of the gelatinized starch.

The method of the instant invention is based upon the fact that the starch chains in ungelatinized starches are held together by glucoside linkages, and in the ungelatinized form, the starch is essentially water-insoluble. On the other hand, when the starch is hydrolyzed or gelatinized, the starch cells become broken into simpler carbohydrates that are, for the most part, water soluble.

Gelatinization becomes important when the end product is to be eaten or used as a food ingredient. Glucoside linkages of ungelatinized starch can be broken down by the enzymes of the digestive system, converting the starch to soluble blood sugars. The action however, of the enzymes on ungelatinized starch, is slow and the breakdown into the soluble blood sugars is somewhat difficult. As a result, digestion of ungelatinized starch is oftentimes incomplete, creating a demand for prior gelatinization in food products containing starch.

It is, therefore, a primary object of the instant invention to provide a method that will result in a high degree of gelatinization, but which does not hamper practical and high production techniques, and which will also permit various shapes and configurations in the end product, as for example, in the form of pellets having wide use in such form, as well as being adapted for further treatment, if desired or necessary, when used as an ingredient of a final product to be commercialized.

Still another important object of the present invention is to provide a process of gelatinization that includes either as a part thereof, or in combination therewith, steps which will also substantially increase the bulk thereof by expansion, all in a manner to avoid adverse effects upon gelatinization during expansion and in a manner to enhance gelatinization by virtue of the expansion itself which takes place during the process.

In the method as will hereinafter be made clear, there is involved certain steps of heating, admixing, moisturizing, compression, product advancement, and pressure release which, when taken together and carried out in the manner hereinafter disclosed, will produce the new and advantageous results above outlined. Reference may, therefore, be made to the accompanying drawings illustrating, by way of example, apparatus advantageously used in carrying out the method of the invention, wherein:

FIG. 4 is an enlarged, fragmentary, side elevational view similar to FIG. 1, parts being broken away and in section to reveal details of construction;

FIG. 5 is a fragmentary, longitudinal, cross-sectional view taken on line 5—5 of FIG. 1; and FIG. 6 is a transverse, cross-sectional view taken on line 6—6 of FIG. 5, parts being broken away for clearness.

Figure 1:
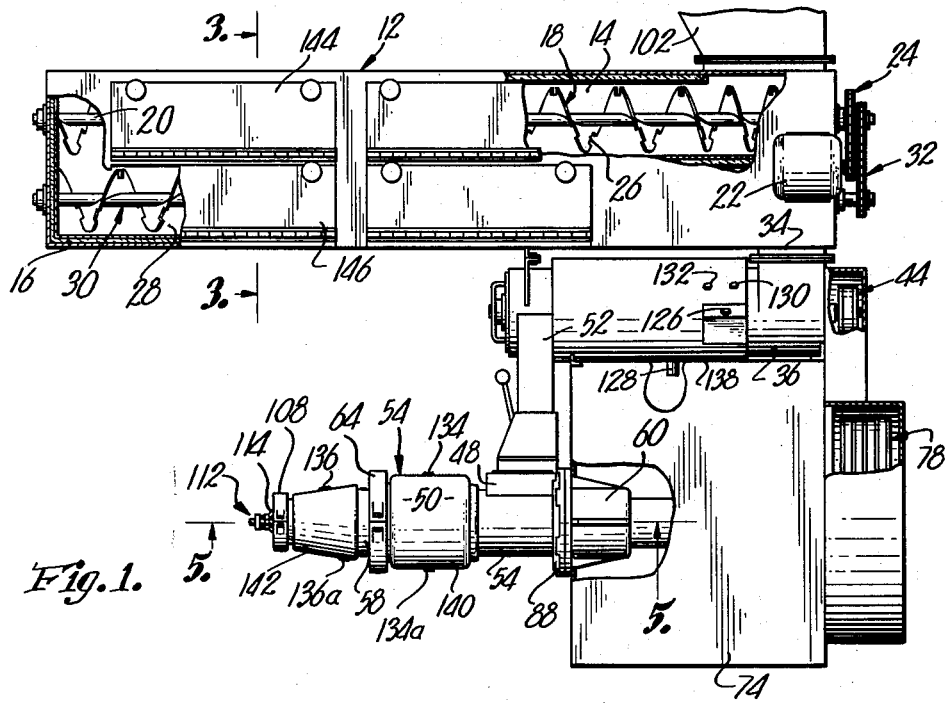
FIGURE 1 is a fragmentary, side elevational view of such apparatus, parts being broken away and in section for clearness.
Figure 2:
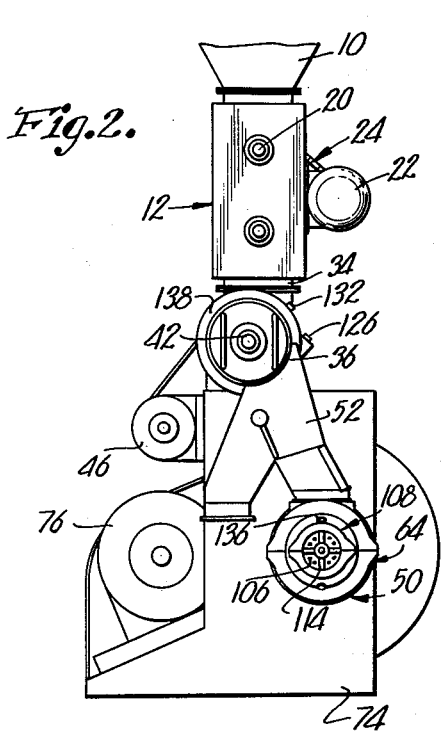
FIG. 2 is a fragmentary, end elevational view thereof.

The product to be treated pursuant to the method of the instant invention, may be introduced into the apparatus illustrated in the drawings by way of a hopper designated by the numeral 10 and illustrated in FIGS. 1 and 2. Manifestly, if it is desired in the end product to have a substantial increase in the bulk thereof, the substance to be treated must initially have expansible characteristics, inasmuch as the method, particularly when carried out through use of the apparatus about to be described, contemplates such bulk increase by expansion.

By the same token, if gelatinization is the primary object insofar as treatment of the product is concerned, then the substance introduced into the hopper 10 must be so characterized and manifestly, one of the best examples of materials which can be gelatinized is starch or starchy substances. Furthermore, it is contemplated by the present invention that, in many instances, the substance to be treated will have both characteristics, i.e., being expansible in nature and capable of being gelatinized.

By way of example, therefore, it has been found that the instant invention has particular merit in the treatment of cereals or cereal based products, for they normally have a high starch content and can be expanded to substantially increase the bulk thereof. By way of illustration, in a typical analysis of yellow corn, it has been found that it has a 56% starch content and includes 8.2% protein, 3% oil and 2.4% fiber, together with varying amounts of ash, pentosans and fatty acids. Such analysis, based upon an 18% moisture content, will vary when the corn is converted to a dry-weight basis, whereupon the analysis will show approximately a 68% starch content. Analyses of other cereals such as wheat, oats, rye, barley, etc. reveal varying levels of starch, most of which are relatively high.

It can be appreciated, therefore, that the method of gelatinization and/or expansion, will vary somewhat upon the particular type of the starting product, as well as its moisture content, and that there will be variances in the method which are governed by humidity conditions, as well as ambient temperature at the point of carrying out the method. It is manifest, that the extent to which the method must be varied, because of such changing conditions, will become fully apparent from an understanding of the present invention.

The hopper 10 communicates with a housing 12 therebelow at one end of the latter, and more particularly, with an elongated, horizontal tube 14 contained within the housing 12 and surrounded by insulation 16. Means for continuously and uninterruptedly conveying the product to the opposite end of the housing 12, is contained within the tube 14 and takes the form of a cut-flight screw 18 coextensive in length with the tube 14, and having its shaft 20 disposed coincidentally with the horizontal axis of tube 14. It is rotated at a predetermined speed through the medium of a suitable prime mover such as an electric motor 22 carried by the housing 12, and operably coupled with the shaft 20 by chain and sprocket means 24. The screw 18 is characterized as a cut-flight conveyor by virtue of the fact that its helical convolutions are provided with a series of spaced notches 26.

A second tube 28 within housing 12, below the tube 14 and in parallelism therewith, is provided with a screw conveyor 30 driven by the prime mover 22 through chain and sprocket means 32. Tube 14 communicates at its discharge end with the tube 28; hence, the material is conveyed in a reverse direction by the screw means 30 which dumps the product into a throat 34 (see FIG. 4) that in turn communicates with a substantially shorter tube 36 therebelow, it being noted that the throat 34 is directly below the hopper 10. The tube 36 contains a blender or mixer 38 provided with a multitude of paddles 40, extending radially from its shaft 42, the latter in turn being driven by belt and pulley means 44 operably coupled with an electric motor 46. Tube 36 communicates with an inlet 48 of an expansion pelleting head broadly designated by the numeral 50, through a conduit 52 into which the product is discharged by the blender or mixer 38.

The head 50 includes a tubular housing 54 provided with a central section 56 (having inlet 48 as an integral part thereof) and a pair of end sections 58 and 60. Rifling 61 and 63 is provided in sections 56 and 58 respectively. Suitable fasteners 62 interconnect the sections 56 and 60 in end-to-end relationship and a circular sectional clamp 64 surrounds the sections 56 and 58 and serves to releasably interconnect the same.

The section 56 contains a relatively long screw 66 and a substantially shorter screw 68, whereas the tapered head section 58 is provided with a tapered screw 70. These three screws are driven by a shaft 72 passing through the section 60 and through a housing 74 for operable connection with a prime mover 76 by way of belt and pulley means 78.

Bearings 80 within the end section 60, support the shaft 72. Suitable seals 82 and 84 surround the shaft 72 within the end section 60 and an additional rotating seal 86 on the shaft 72 is journalled within end plate 88 of main section 56, which end plate 88 also receives the fasteners 62.

A central driving shaft 90 for the screws 66, 68 and 70, disposed in end-to-end relationship with the shaft 72, and operably coupled therewith, is surrounded by the tubular shaft 92 of screw 66. The screw 68 also surrounds the shaft 90 and the latter extends into one end of the core 94 of screw 70. Shaft 90 is provided with splines 96 affording a driving connection thereof with all three screws 66, 68 and 70.

A steam lock die 98, provided with die openings 99, is releasably clamped in place between the sections 56 and 58 and is provided with a bushing 100 for the shaft 90. An agitator 102 on the shaft 90 is interposed between the bushing 100 and the proximal end of the screw 68.

A die 104, provided with openings 106, is releasably attached to the outermost free end of the conical nose section 58 by a clamp 108 and journals an extension 110 of the core 94. A knife assembly 112, keyed to the extension 110 for rotation therewith, is provided with a plurality of blades 114 held biased against the outer face of the die 104 by spring means 116 forming a part of the assembly 112, it being understood that the blades 114 rotate continuously across the die openings 106 with respect to the fixed die 104.

The pre-conditioner of the apparatus thus far outlined, includes the dual stage steamer feeder contained in the housing 12 and the mixing-conditioning tube or cylinder 36. Accordingly, steam inlets 118 and 120 are provided for the tubes 14 and 28 respectively, to introduce steam into the material, and steam inlets 122 and 124 are provided for introducing steam into the housing 12 exteriorly of the tubes 14 and 28 respectively.

In a similar manner, steam is introduced into the cylinder 36 through inlet 126 and to the latter exteriorly thereof by way of steam inlet 128. Hot water may be fed into the cylinder 36 by way of inlet 130 and still another inlet 132 is provided for the cylinder 36 to receive fats and other substances to be admixed with the materials being handled by the mixing-conditioning cylinder 36.

Figure 3:
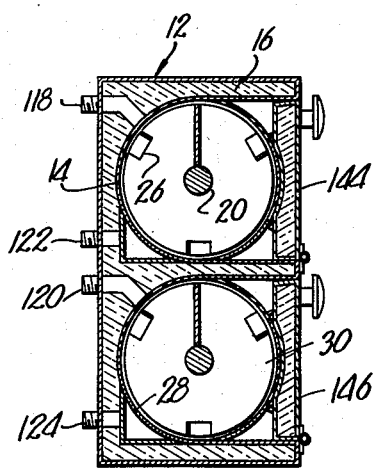
FIG. 3 is an enlarged, transverse, cross-sectional view taken on line 3—3 of FIG. 1.

The head 50 is likewise provided with means to heat the material, section 56 of the housing 54 being provided with inlet 134 for the purpose of introducing steam to the section 56 exteriorly thereof, and in a similar manner, a steam inlet 136 is provided to introduce steam to the exterior of the cone nose section 58. Jackets 138, 140 and 142, around the cylinder 36, the section 56 and the section 58 respectively, receive the steam, and the housing 12, made as best seen in FIG. 3, provides the jackets for the tubes 14 and 28. Steam condensate return openings are provided for all of the jackets, as for example, at 134a and 136a in FIGS. 1 and 4 with respect to jackets 134 and 136. Service doors 144 and 146 are provided in the housing 12 for the tubes 14 and 28 respectively.

Prior to introduction of the material into the hopper 10, it should, particularly when taking the form of a cereal product, be ground, comminuted or otherwise reduced to a relatively fine mash, and such step is to be desired whether or not the product contains ingredients other than one or more cereals. The extent to which the mash is moisturized in the pre-conditioner will depend upon many factors including the moisture content of the mash as it enters the hopper 10, and by way of example, a 10% moisture content is not at all unusual.

It is important in the method that the material be advanced continuously and uninterruptedly from the time it enters the first tube 14 of the pre-conditioner, until it is released from the head 50 through the die 104. This is important, not only from the standpoint of economy in order to produce large quantities of an excellent end product in a short period of time, but to assure such excellence, as well as uniformity in the final product. Hence, it is to be preferred that all of the prime movers for actuating the various material advancing components of the apparatus, as above described, be readily and easily varied insofar as speed of operation is concerned, so that the material advances at all times at a controlled rate. Whether or not the material can be choke-fed in the pre-conditioner, again depends upon operating conditions such as ambient temperature and humidity, as well as the condition of the mash as initially introduced. For the most part however, such choke-feeding will not be desired or possible, since it is essential to reach a point of substantial saturation of the product with moisture before it enters the inlet 48 of the head 50.

The selection of the cut-flight conveyors 18 and 30 is therefore, in part, for the purpose of causing the mash to absorb as much moisture as possible from the steam being introduced through inlets 118 and 120. These conveyors are inherently capable of continuously advancing the material and at the same time, gradually and progressively mixing and blending the moisture and mash, as well as gradually and progressively raising the temperature of the entire mass.

The pre-conditioner continues to accomplish these desired results through the operation of the mixing-conditioning cylinder 36 by virtue of the fact that steam or water, or both, may be introduced into the material because of the provision of inlets 126 and 130. Hence, insofar as moisture absorption is concerned, the method contemplates the addition of steam or hot water, or both, through use of the pre-conditioner which includes the 2-stage steamer feeder and the mixing-conditioning cylinder. This raising of the moisture content of the mash to a point of saturation or essentially maximum absorption, is also a factor in raising the temperature of the mass and, for the most part, in the case of most materials being treated, it is somewhat easier to increase the temperature through the use of steam rather than the mere use of hot water. There are other factors that are important to the temperature raising requirement, including the jackets in the pre-conditioner. These tube-encircling jackets for receiving the steam, not only prevent heat loss to the atmosphere from the material itself, but conversely, tend to assist in raising the temperature of the material as it is advanced through such heated zones which might advantageously completely envelop the entire path of travel of the meal from the time it enters the first tube 14 until it is discharged into the head 50.

In the event the end product is to be used as a food or as a food ingredient, it is important to consider palatability; therefore, the temperature rise should not be permitted to continue in an uncontrolled manner above certain limits, but should be predetermined, based upon the nature of the mash and the end product desired.

While it is not necessary, if all of the components of the machine illustrated and described are used, to raise the temperature of the product to a point of complete gelatinization in the pre-conditioner and prior to flow into the head 50, it is nonetheless desirable to attempt to reach such gelatinization temperature of approximately 60 to 80 degrees centigrade for most cereal products. It is to be noted additionally, that such rise in temperature is accomplished also, in part at least, by mechanical friction which results from the pressures that are necessarily exerted upon the mash as an incidence to advancement through use of the several conveying means 18, 30 and 38; however, this pressure factor becomes much more pronounced in the head 50 as hereinafter explained.

The factors above described may well vary somewhat also, depending upon the nature of substances, if any, that are added at the inlet 132. In addition to low level fats, oils or shortening as above indicated, it is conceivable that such ingredients may be added as liquid sugar solutions, vitamins in liquid solution or emulsion, milk products and other liquids. Whether only steam and/or water are applied in the mixer-conditioner, or whether other substances are added, it is quite important that they be uniformly and evenly applied and thoroughly mixed into the mash feeds in order to attain good uniformity of the end product, proper uniformity of gelatinization, and the desired uniformity of expansion. The importance of the paddles 40 to blend together the solids, the liquids and the vapors now becomes quite apparent.

The actions above described, continue for the most part, throughout the time that the product is in the head 50, but the rate of temperature rise is greatly increased again gradually and progressively in boh sections 56 and 58. At the outset, the product is compressed to relatively high pressures by the action of screw 66. Thereupon, by a still different pitch in the screw 68, the latter raises the pressure and therefore, the temperature, of the product still higher before it passes through the die 98 and into the coned nose section 58. All the while, the rise in temperature is enhanced by the steam that is continuously introduced into the jacket 140 to the inlet 134. Die 98 operates to alleviate pressure losses in the section 58 by back pressure which would otherwise tend to cause reverse movement of the product, or impede its continuous advancement. Furthermore, the agitator 102 operates to continually feed the product through the die 98 uniformly and without clogging or substantial reduction in the rate of continuous advancement through the head 50.

Finally, in the nose section 58, by virtue of its conical configuration and the complemental shape of the screw 70, the mass of material is gradually, yet rapidly and substantially compressed as it approaches the die 104, since the rate of flow into the section 58 remains uniform through the die 98 and discharge from the section 58 is at all times impeded by the presence of die 104. By way of example, particularly where maximum expansion and complete gelatinization is desired, the pressure within section 58 should be sufficiently great to raise the temperature of the product well above 100 degrees centigrade. And again, it is to be noted that such temperature rise is enhanced by the continuous presence of steam within the jacket 142 surrounding the section 58, as well as by the introduction of steam into section 58, if desired, via inlet 59.

Since gelatinization normally takes place in several distinct stages, it can be appreciated that partial gelatinization occurring throughout the pre-conditioner, and within the section 56, becomes essentially complete prior to the time of extrusion through the die 104. From an expansion standpoint, the high temperature in the product within the section 58, also brings the moisture contained in the product well above its boiling point. This tendency to boil within the section 58 manifestly creates a tendency to expand, but no such expansion is possible in the product while it is within the section 58 because of the high compressive forces being imparted thereto. It follows, therefore, that the instantaneous release of pressure on the product by virtue of its passage or extrusion through the die openings 106, causes maximum expansion and, therefore, maximum increase in the bulk of the end product. Knives 114 operate to sever or otherwise change the extrusions into pellets of substantially uniform lengths.

It is to be pointed out at this juncture, however, that it is not essential to the primary objects of the method of the invention to extrude the material, since the important facet of the discharge from section 58 is the instantaneous release of pressure and resultant maximum expansion. Further, if extrusion is used as illustrated, the shape and size of the fragments or particles may be varied as desired and need not necessarily be characterized as a pellet.

The phenomenon of gelatinization has heretofore been disclosed in many publications, and it is not my intention to be limited by any particular theory, but rather to adopt the fact that starches and the like are changed from an insoluble to a soluble condition if gelatinization is, in, fact, accomplished. Cells of the starch in the process above outlined, rupture and become characterized as a dispersion of swollen water-soluble particles.

It is to be understood also, that the use of the end product is likewise of no particular consequence. For example, if the same are to be used as food or as an ingredient in food products, it can be expected that the method be used in the production of such foods as breakfast cereals, party snacks, macaroni, spaghetti, pastes or doughs for making, hominy grits, bread, rolls, biscuits, gluten meal pellets or products made from such meals, and a wide variety of other products for animal or human consumption.

It is to be clearly understood that the apparatus above described is capable of carrying out the method of the invention in an economical and commercially practical manner, but the method is not limited to the use of any particular type of equipment. For example, preconditioning can be accomplished in other ways, or indeed in the cylinder 36 alone, but at reduced capacities if the same end product is desired.

Having thus described the invention, what is claimed as new and desired to be secured by Letters Patent is:

1. The commercial, high production method of increasing palatability and digestibility of a cereal product having a high starch content by gelatinization of said starch, which comprises the steps of:
reducing the cereal product to a relatively fine mash;
mechanically advancing the mash at a controlled uniform rate through a preconditioning zone of substantial length;
gradually and progressively mixing and blending with said mash at substantially atmospheric pressure, a moisturizing agent selected from the group consisting of water, steam and mixtures thereof and having a temperature above that of the mash in a quantity sufficient to gelatinize said starch;
maintaining the mash in said preconditioning zone under essentially atmospheric pressure until the temperature thereof is raised to at least the gelatinization temperature to initiate gelatinization of starch in the mash;
gradually reducing the transverse dimensions of the mass of said mash while continuously advancing the same at said rate through a final heating and compression zone, said mash being compressed in said final zone to an extent to raise the temperature of the mash beyond the gelatinization temperature to fully gelatinize the starch therein; and releasing the pressure on the mash prior to discontinuing its advancement.

2. A method as set forth in claim 1 wherein is included the steps of supplying heat to the mash in said preconditioning zone from an external source in surrounding relationship to the preconditioning zone.

3. A method as set forth in claim 1 wherein is included the steps of supplying heat to the mash in said final zone from an external source in surrounding relationship to the final zone.

4. A method as set forth in claim 1 wherein said moisturizing agent is mixed and blended into the mash substantially through the length of said preconditioning zone.

5. The commercial, high production method of increasing palatibility and digestibility of a cereal product having a high starch content by gelatinization of said starch, which comprises the steps of:

reducing the cereal product to a relatively fine mash;

mechanically advancing the mash at a controlled uniform rate through a preconditioning zone of substantial length;

gradually and progressively mixing and blending with said mash at substantially atmospheric pressure, a heated moisturizing agent selected from the group consisting of water, steam and mixtures thereof having a temperature above that of the mash in a quantity sufficient to gelatinize said starch;

maintaining the mash in said preconditioning zone under essentially atmospheric pressure until the temperature thereof is raised to at least 60° C. to initiate gelatinization of starch in the mash;

then advancing the mash at said rate through a final heating and compression zone of gradually and progressively decreasing transverse dimensions in the direction of advancement of the mash to compress the latter to an extent to raise the temperature of the mash above 100° C. to fully gelatinize the starch therein; and releasing the pressure on the mash at the instant of discharge of the mash from said final zone to expand the mash and further enhance gelatinization.

6. A method as set forth in claim 5 wherein the temperature of the mash is raised to a level of from 60–80° C. in said preconditioning zone.

7. A method as set forth in claim 5 wherein said moisturizing agent comprises the combination of steam and hot water.

References Cited in the file of this patent

UNITED STATES PATENTS

| | | |
|---|---|---|
| 1,725,171 | Anderson | Aug. 20, 1929 |
| 2,060,408 | Wood | Nov. 10, 1936 |
| 2,489,267 | Chapin | Nov. 29, 1949 |
| 2,705,927 | Graves et al. | Apr. 12, 1955 |
| 2,802,430 | Filler | Aug. 13, 1957 |
| 2,915,957 | Bowman | Dec. 8, 1959 |